US012540722B1

(12) United States Patent
Li

(10) Patent No.: US 12,540,722 B1
(45) Date of Patent: Feb. 3, 2026

(54) MULTIPURPOSE CAMPING LAMP

(71) Applicant: Ningbo Jinlida lamp decoration co., Ltd, Zhejiang (CN)

(72) Inventor: Zheyi Li, Zhejiang (CN)

( * ) Notice: Subject to any disclaimer, the term of this patent is extended or adjusted under 35 U.S.C. 154(b) by 0 days.

(21) Appl. No.: 18/788,157

(22) Filed: Jul. 30, 2024

(51) Int. Cl.

| | |
|---|---|
| ***F21V 21/14*** | (2006.01) |
| ***F21L 4/08*** | (2006.01) |
| ***F21V 17/10*** | (2006.01) |
| ***F21V 21/40*** | (2006.01) |
| ***F21V 23/06*** | (2006.01) |
| ***F21V 33/00*** | (2006.01) |
| ***F21W 111/10*** | (2006.01) |

(52) U.S. Cl.

CPC ............ *F21V 21/145* (2013.01); *F21L 4/085* (2013.01); *F21V 17/105* (2013.01); *F21V 21/406* (2013.01); *F21V 23/06* (2013.01); *F21V 33/00* (2013.01); *F21V 33/0056* (2013.01); *F21V 33/008* (2013.01); *F21V 33/0096* (2013.01); *F21W 2111/10* (2013.01)

(58) Field of Classification Search

CPC .... F21V 21/145; F21V 21/406; F21V 17/105; F21V 23/06; F21V 33/0056; F21V 33/0096; F21V 33/008; F21V 33/00; F21V 33/0064; F21V 33/0044; F21L 4/085; F21W 2111/10

USPC ........................................ 362/191, 253, 234

See application file for complete search history.

(56) References Cited

U.S. PATENT DOCUMENTS 12,326,252 B1 * 6/2025 Deng .................. F21V 33/0096
2014/0321106 A1 * 10/2014 Workman ............. F21V 23/003 362/249.02
2015/0192243 A1 * 7/2015 Sharrah ..................... F21L 4/00 362/190
2015/0300581 A1 * 10/2015 Huang ............... H05B 47/1965 362/86
2022/0141564 A1 * 5/2022 Tsuge ...................... F21V 23/06 381/334

FOREIGN PATENT DOCUMENTS

CN 114198655 A * 3/2022 ............. F21L 4/025

* cited by examiner

*Primary Examiner* — Laura K Tso

(74) *Attorney, Agent, or Firm* — Hawaii Patent Services; Nathaniel K. Fedde; Kenton N. Fedde

(57) ABSTRACT

A multipurpose camping lamp comprises a camping lamp body and a plurality of function expansion modules, wherein a control module and a storage battery module are arranged in the camping lamp body; a power supply connection mechanism is arranged between the function expansion modules and the camping lamp body; the function expansion modules are electrically connected with the storage battery module in the camping lamp body through the power supply connection mechanism and supplies power to the function expansion modules through the storage battery module; the camping lamp further includes an adaptive placement base detachably connected to the bottom of the camping lamp body.

20 Claims, 16 Drawing Sheets

MULTIPURPOSE CAMPING LAMP

TECHNICAL FIELD

The present invention relates to the technical field of camping lamps, in particular to a multipurpose camping lamp.

BACKGROUND

Camping lamps are usually used when camping outdoors. The camping lamp is a kind of portable lighting equipment specially designed for outdoor camping activities and is durable, waterproof, and portable, and can provide the necessary light source at night in the wild.

Published application US20140268707A1 discloses an "OUTDOOR CAMPING LAMP." However, the camping lamp of this patent application has a single function, which cannot meet the diverse outdoor needs of campers, such as repelling mosquitos and playing music.

Therefore, there is a need for a new type of camping lamp, which can replace different functional modules according to the needs of users, so as to meet different requirements.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a multipurpose camping lamp to solve the problem that the function of the existing single function camping lamp cannot meet the diversified outdoor needs of campers.

In order to achieve the above object, the present invention adopts the following technical solution:

the present invention provides a multipurpose camping lamp, which includes a camping lamp body and a plurality of function expansion modules, wherein a control module and a storage battery module are arranged in the camping lamp body; a power supply connection mechanism is arranged between the function expansion modules and the camping lamp body; the function expansion modules are electrically connected with the storage battery module in the camping lamp body through the power supply connection mechanism and supply power to the function expansion modules through the storage battery module; and the multipurpose camping lamp further includes an adaptive placement base detachably connected to a bottom of the camping lamp body, and the adaptive placement base is capable of automatically keeping horizontal according to a terrain.

The present invention further provides a multipurpose camping lamp, which includes a camping lamp body and a plurality of function expansion modules, wherein the expansion modules are detachably connected with the camping lamp body, and a power supply connection mechanism is arranged between the function expansion modules and the camping lamp body;

the multipurpose camping lamp further includes an adaptive placement base detachably connected to a bottom of the camping lamp body, wherein the adaptive placement base includes a supporting mechanism and an infusion mechanism for conveying liquid media to the supporting mechanism, and the infusion mechanism is used for pushing the supporting mechanism to extend.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
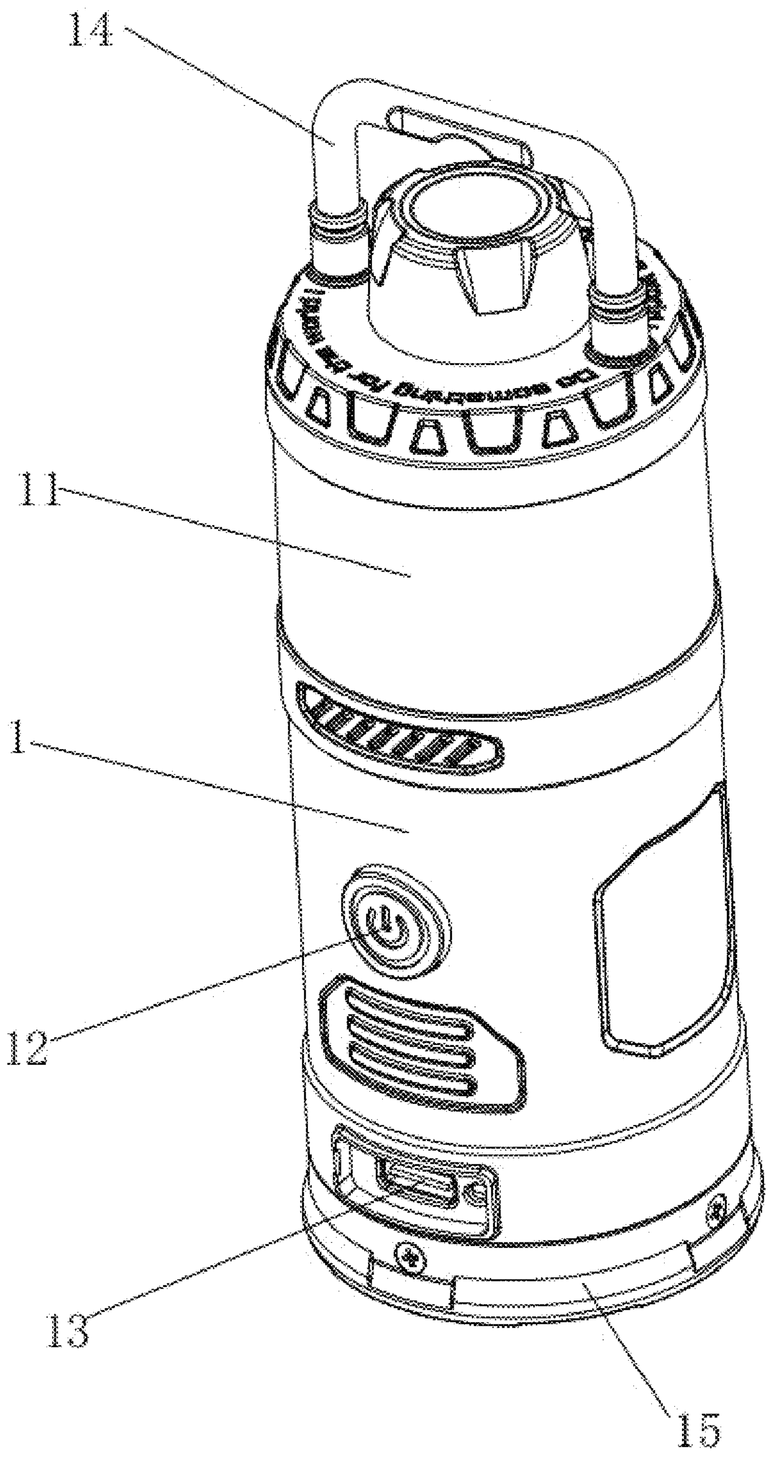
FIG. 1 is a schematic structural view of a camping lamp body in one direction.

Reference signs: Camping lamp body (1); Light-transmitting cover (11); Switch (12); Charging port (13); Handle (14); Conical surface (15); USB female connector (16); Magnet (17); Mosquito repellent module (2); BLUETOOTH®audio module (3); Lighting module (4); Air pump module (5); Fan module (6); Bottom plate (71); Primary liquid pipe (72); First elastic buckle (73); Piston barrel (74); Pressing post (75); Second elastic buckle (76); Sleeve (78); Telescopic rod (79); Liquid distributor (710); Secondary liquid pipe (712), Sliding limit pin (713); Limit groove (714); Elastic sheet (715); Pressing contact block (716); Guide hole (717); Spring (718); First liquid chamber (719); First piston (720); Ejector rod (721); Second piston (722); Retaining ring (723); Second liquid chamber (724); USB male connector (8); Magnetic attraction body (9).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being “on,” “coupled to,” or “connected to” another element or layer, it can be directly on, directly coupled to or directly connected to the other element or layer, or intervening elements or layers may be present. In contrast, when an element is referred to as being “directly on,” “directly coupled to,” or “directly connected to” another element or layer, there are no intervening elements or layers present. Like numbers refer to like elements throughout. As used herein, the term “and/or” includes any and all combinations of one or more of the associated listed items.

As used in the description of the inventive concept and the appended claims, the singular forms “a,” “an,” and “the” are intended to include the plural forms as well, unless the context clearly indicates other.

Figure 2:
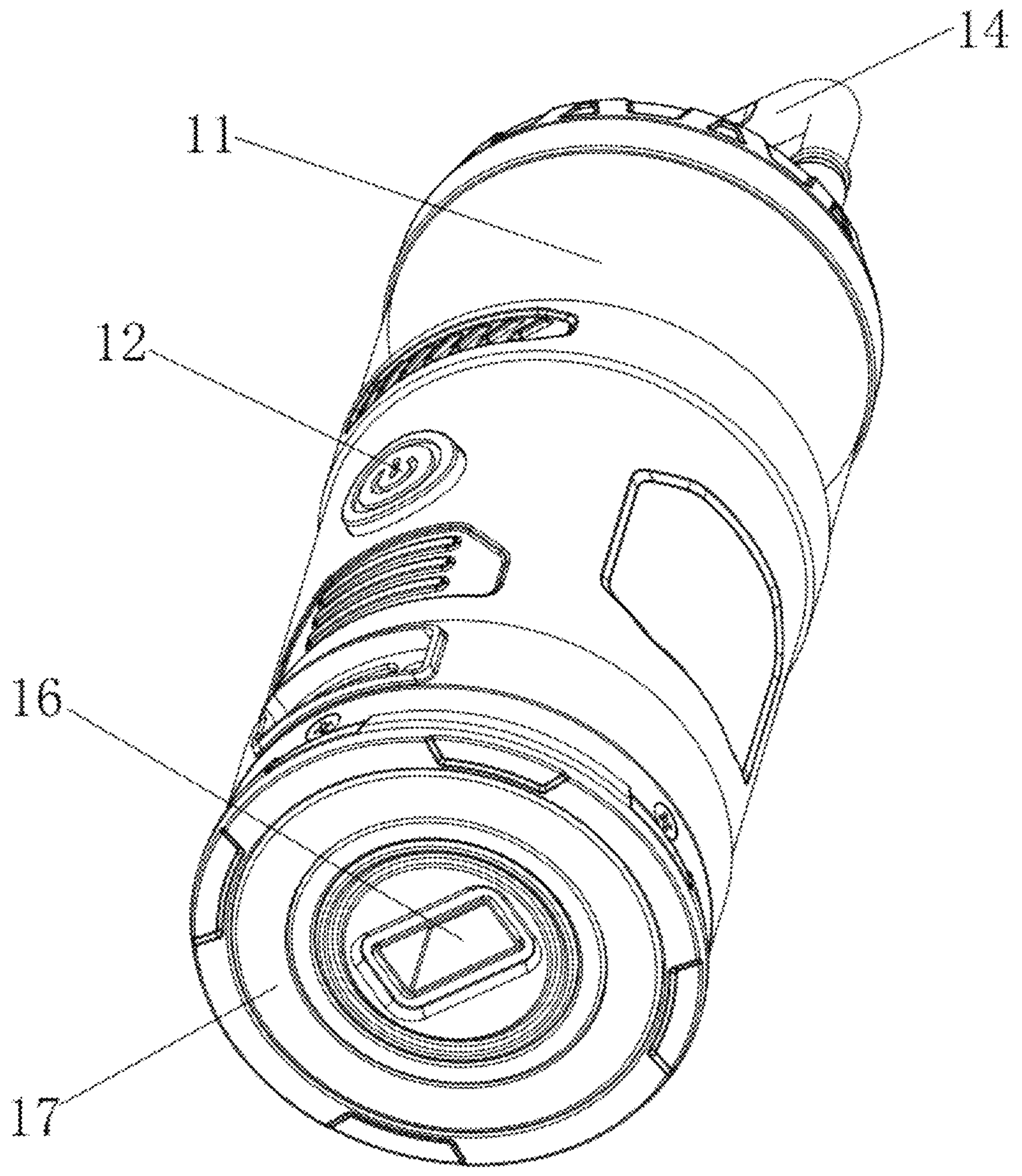
FIG. 2 is a schematic structural view of the camping lamp body in another direction.
Figure 3:
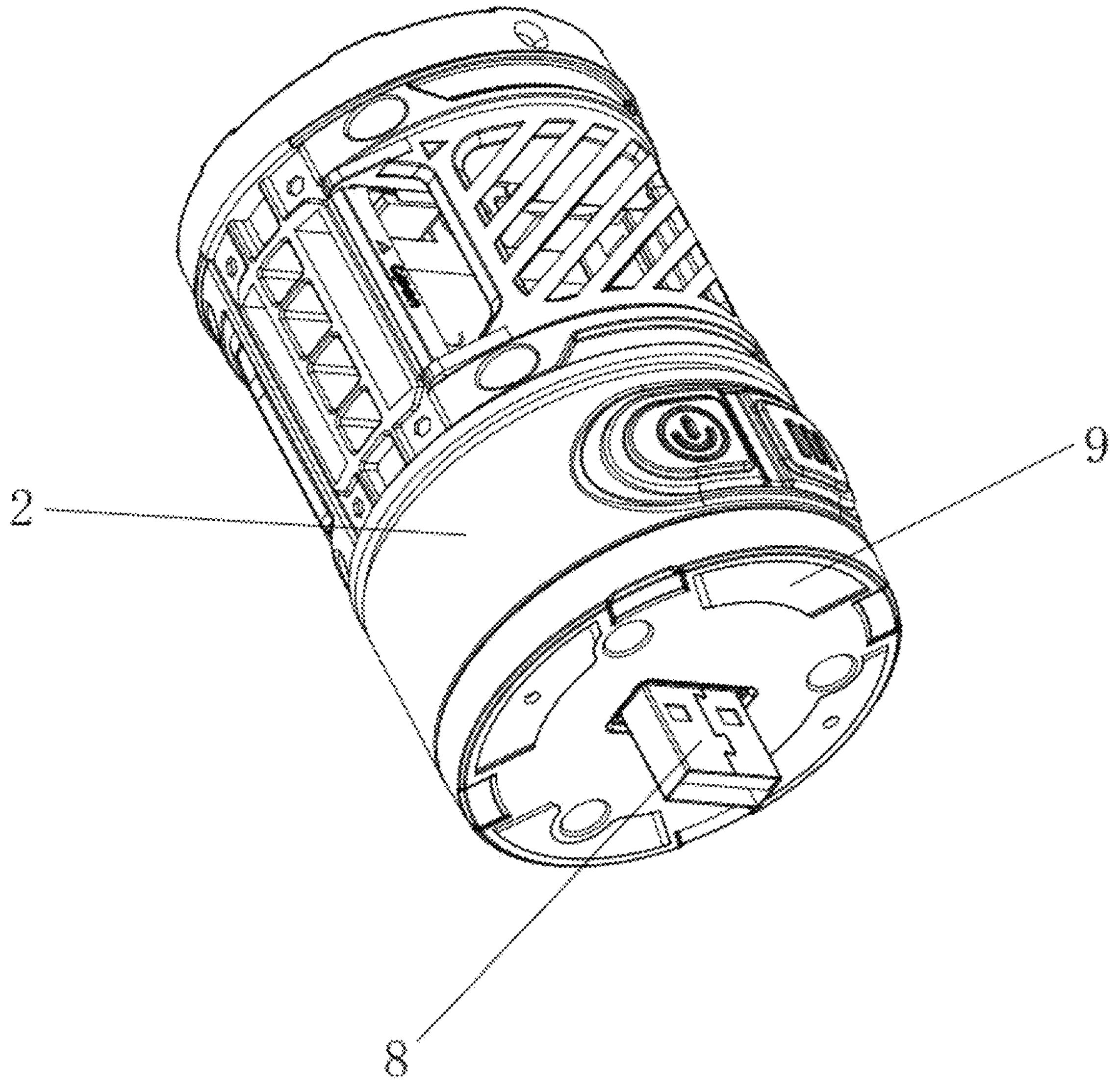
FIG. 3 is a schematic structural diagram of the mosquito repellent module.
Figure 4:
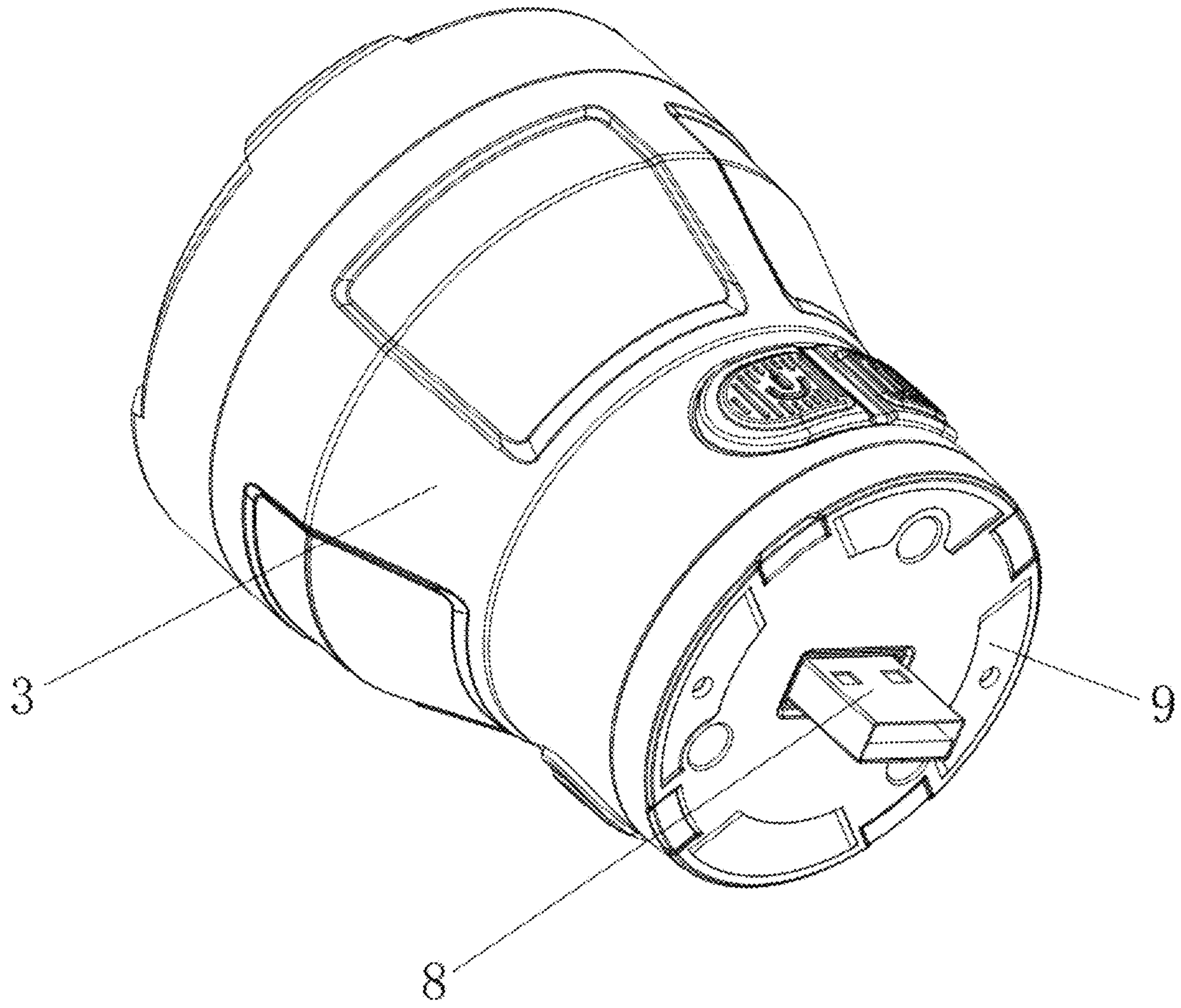
FIG. 4 is a schematic structural diagram of the BLUETOOTH® (BLUETOOTH® SIG, Inc., Kirkland, WA) audio module.
Figure 5:
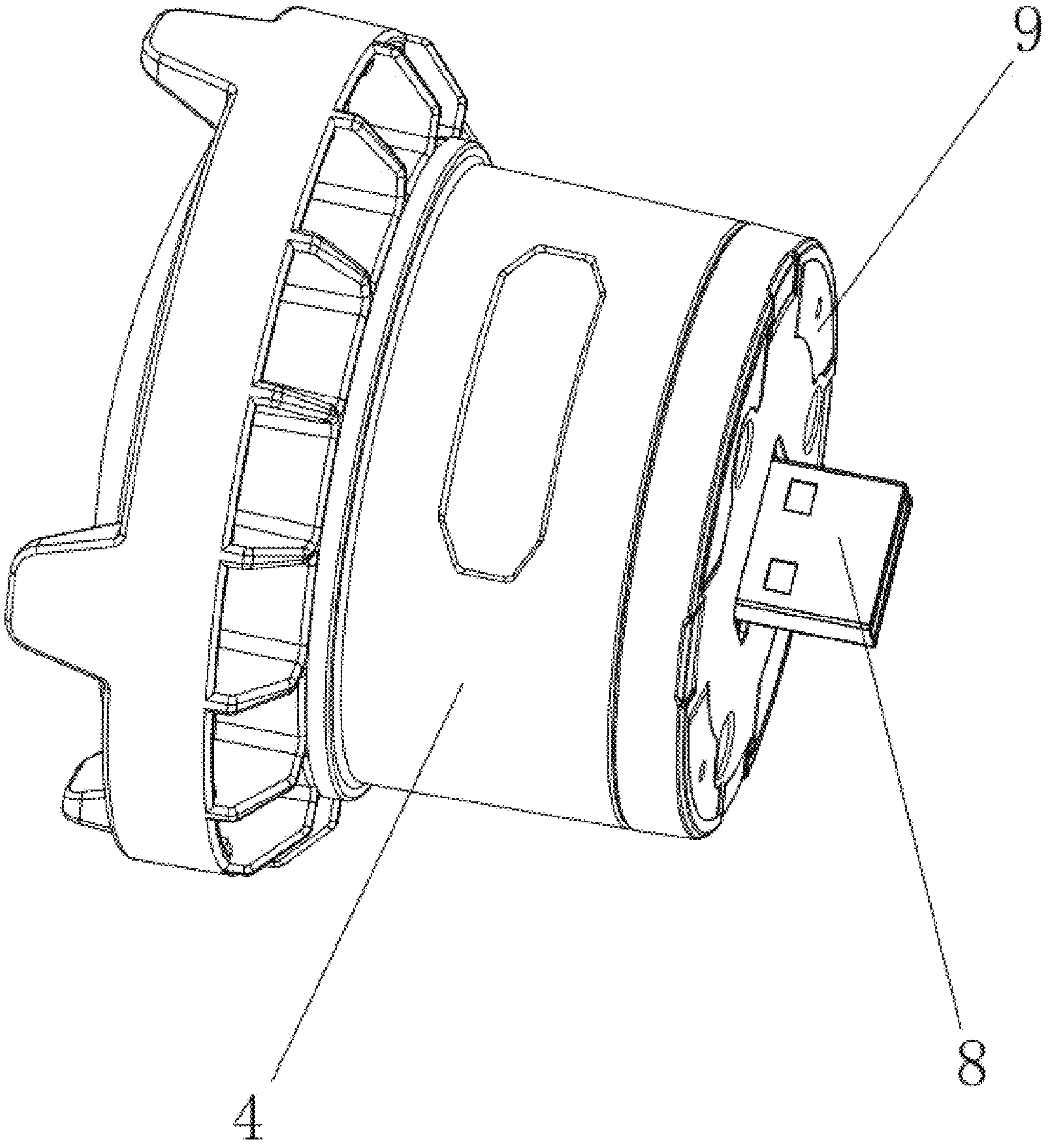
FIG. 5 is a schematic structural diagram of the lighting module.
Figure 6:
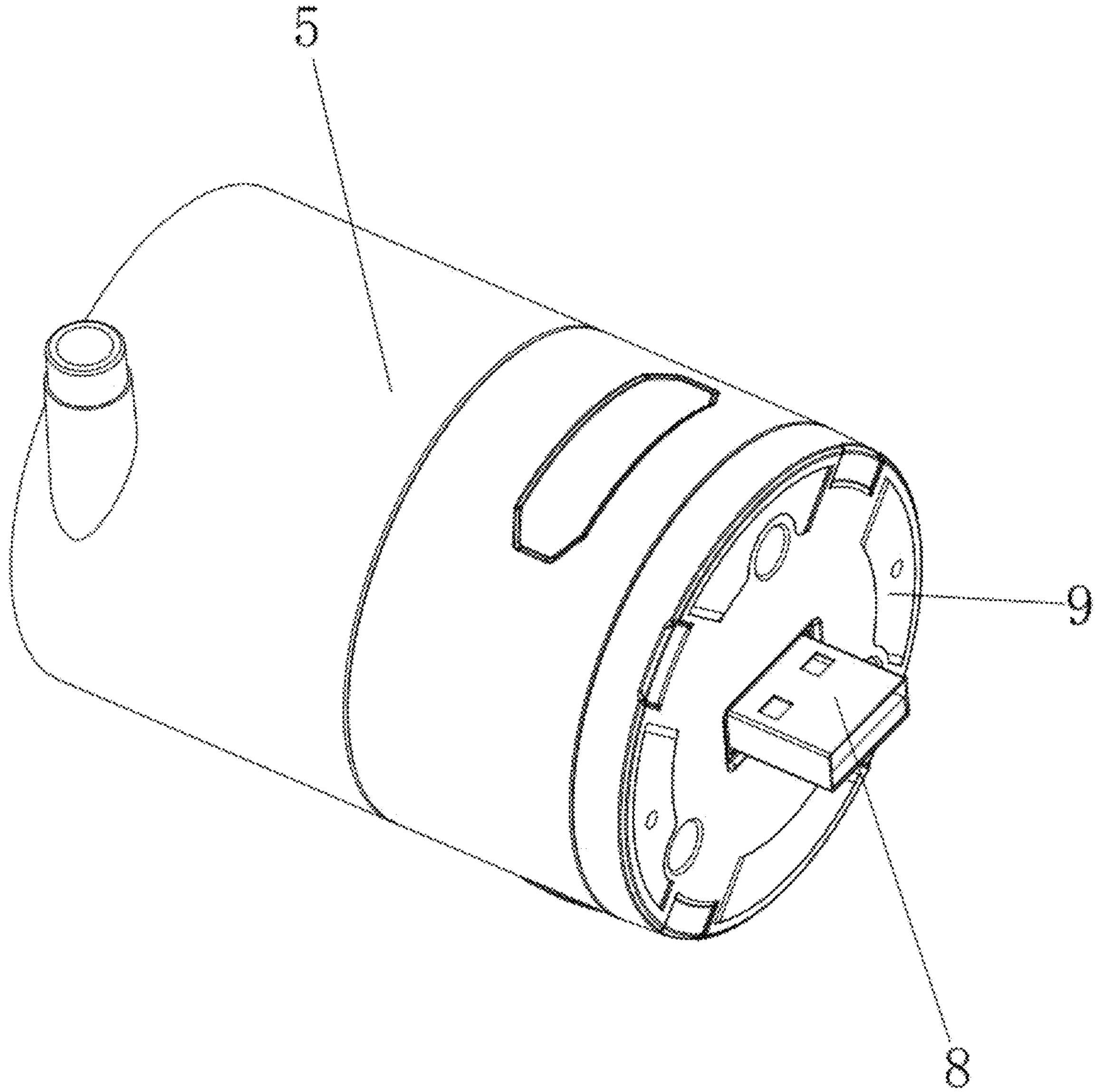
FIG. 6 is a schematic structural diagram of the air pump module.
Figure 7:
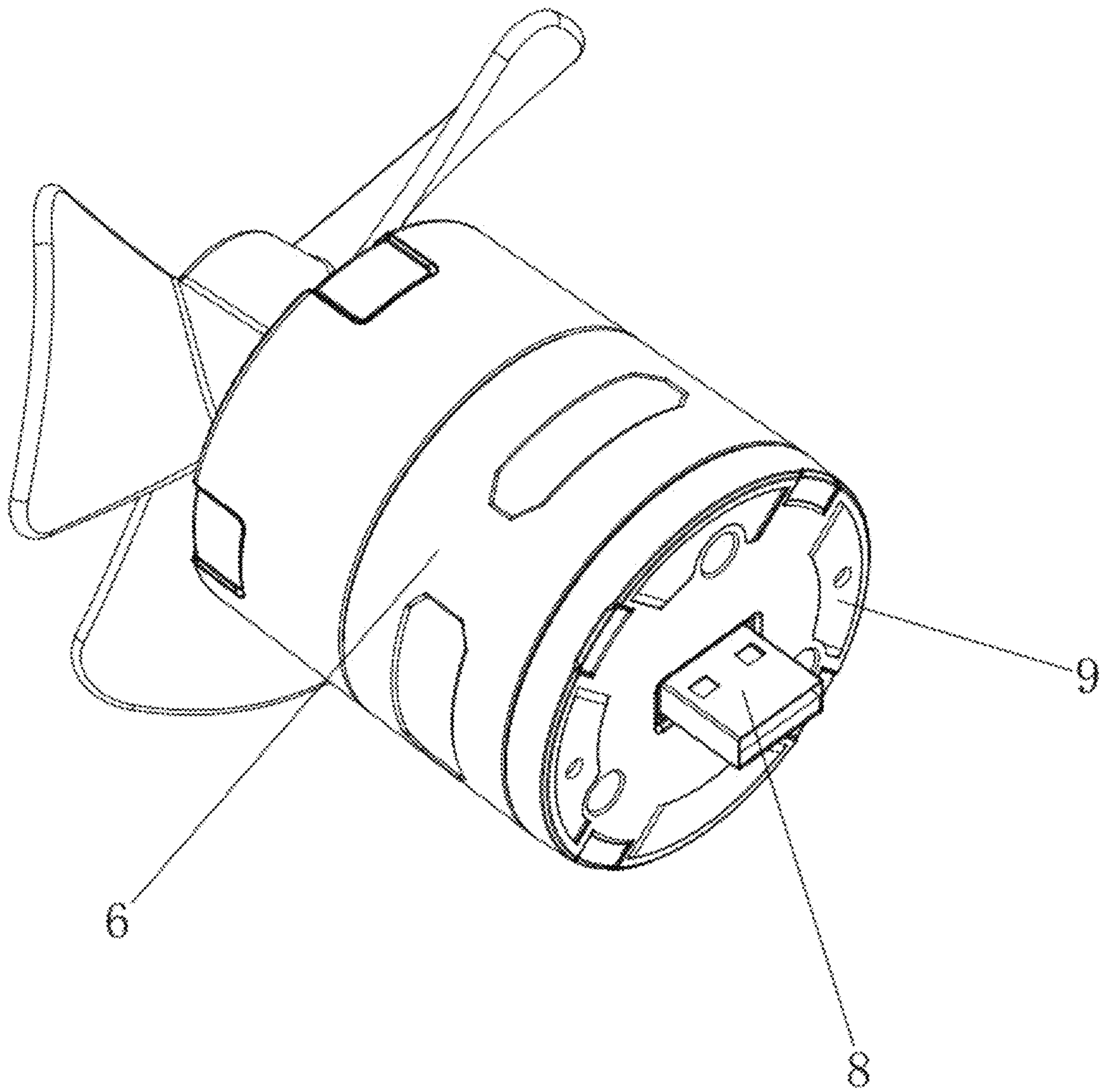
FIG. 7 is a schematic structural diagram of the fan module.
Figure 8:
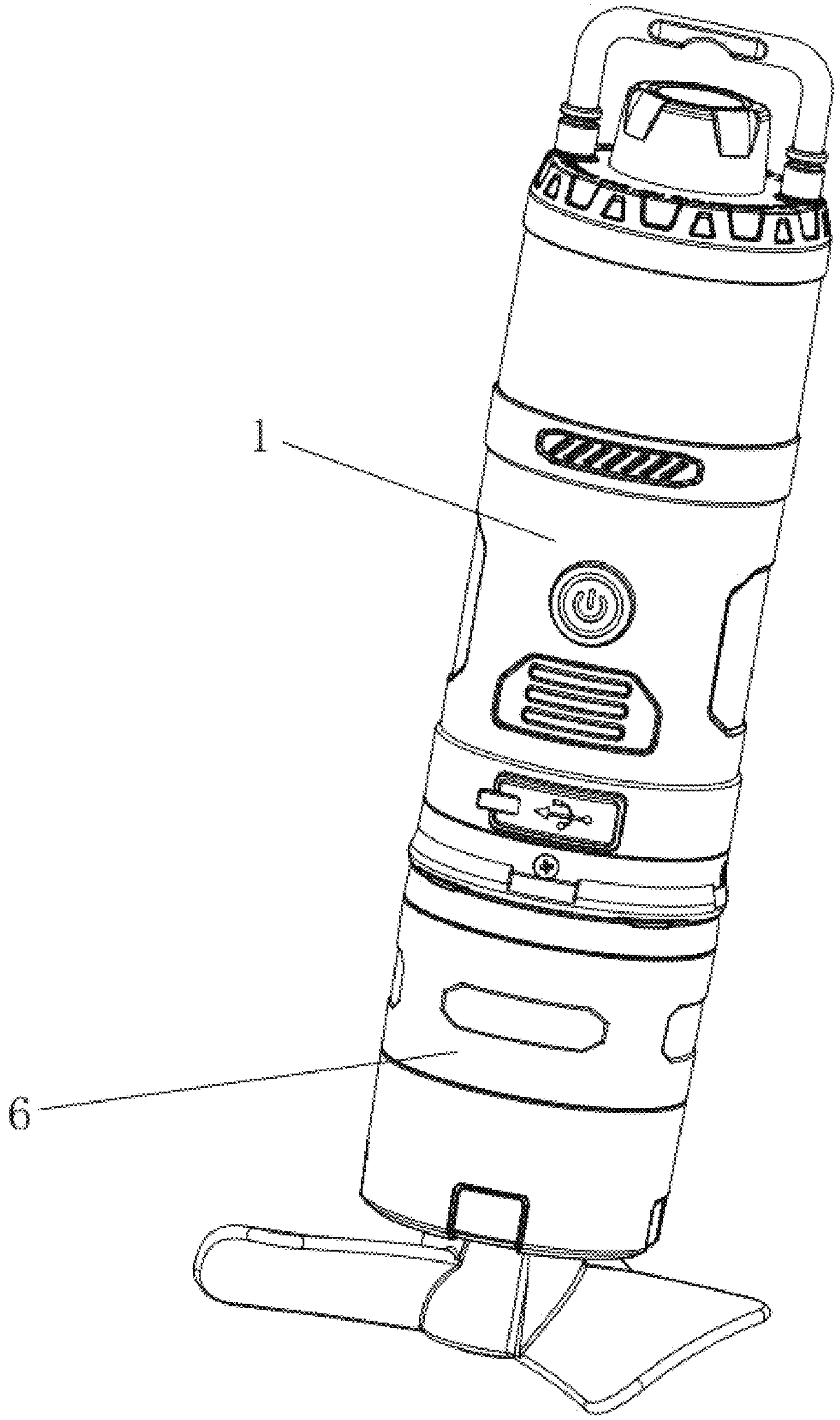
FIG. 8 is a schematic view where the camping lamp body is connected to the fan module.
Figure 9:
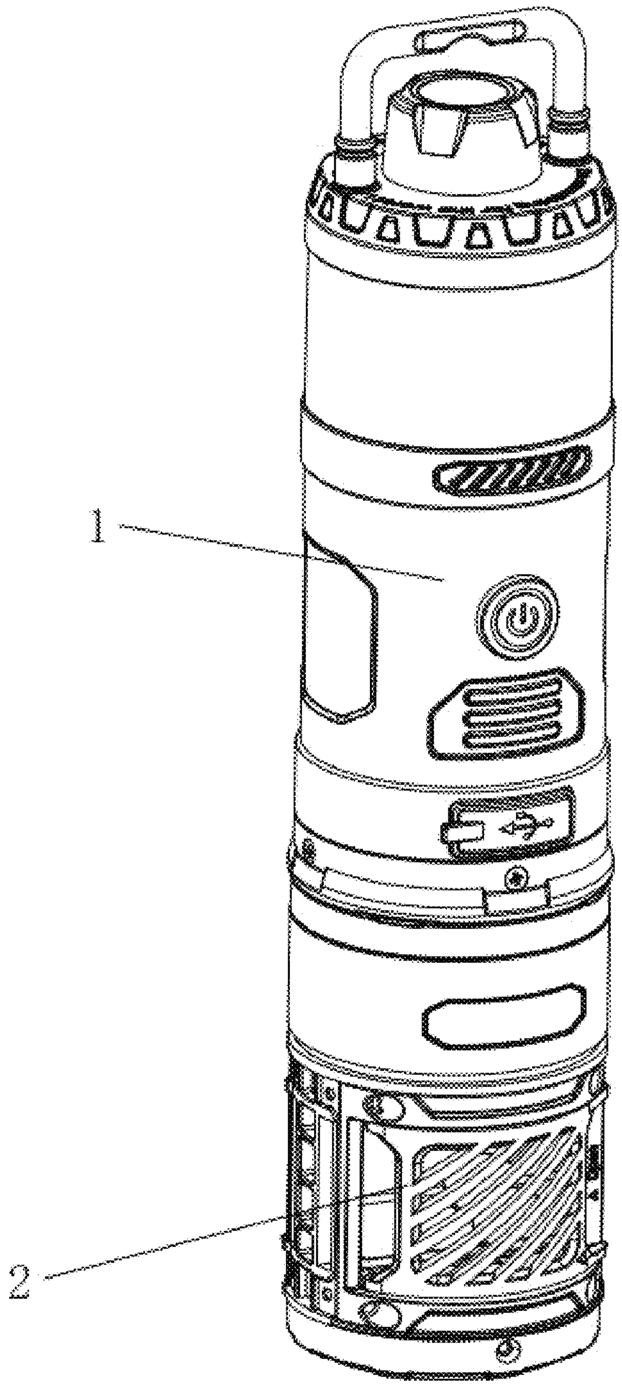
FIG. 9 is a schematic view where the camping lamp body is connected to the mosquito repellent module.
Figure 10:
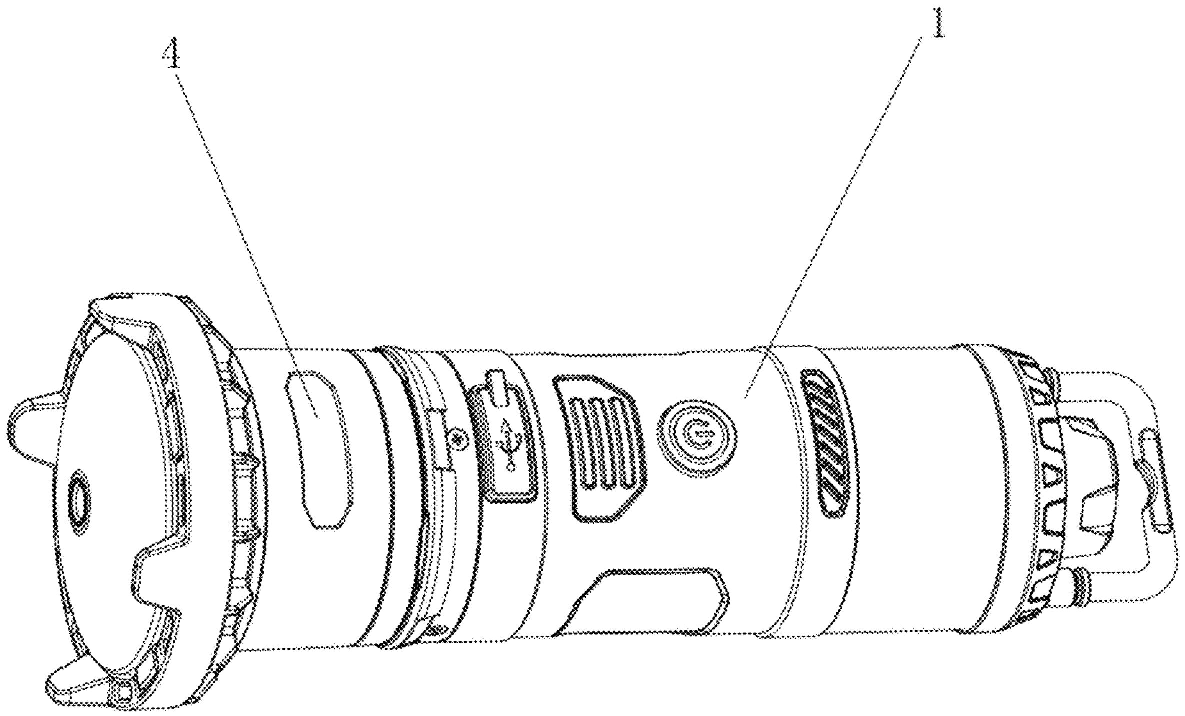
FIG. 10 is a schematic diagram where the camping lamp body is connected to the lighting module.
Figure 11:
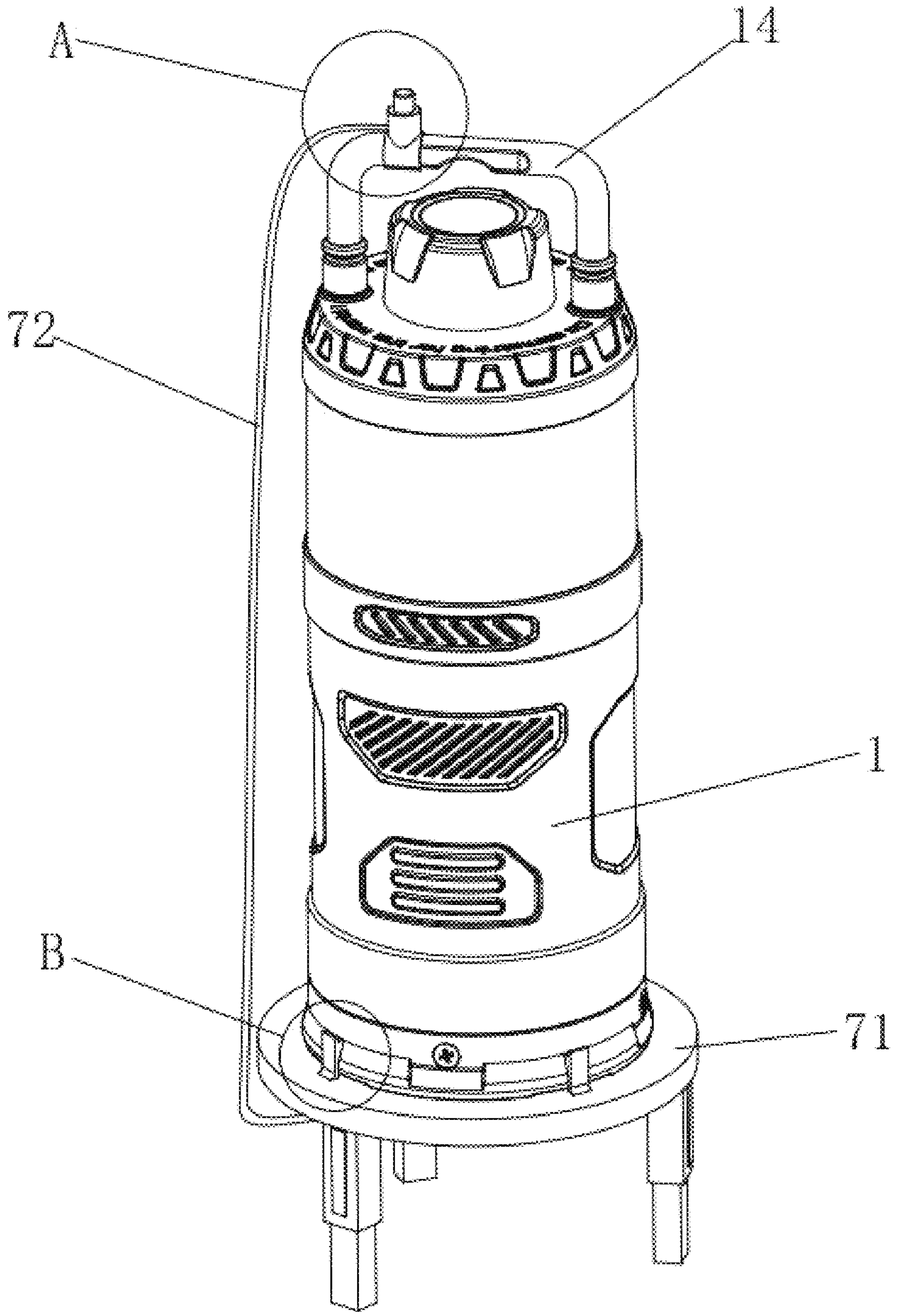
FIG. 11 is a schematic view where the camping lamp body is connected to the adaptive placement base.
Figure 12:
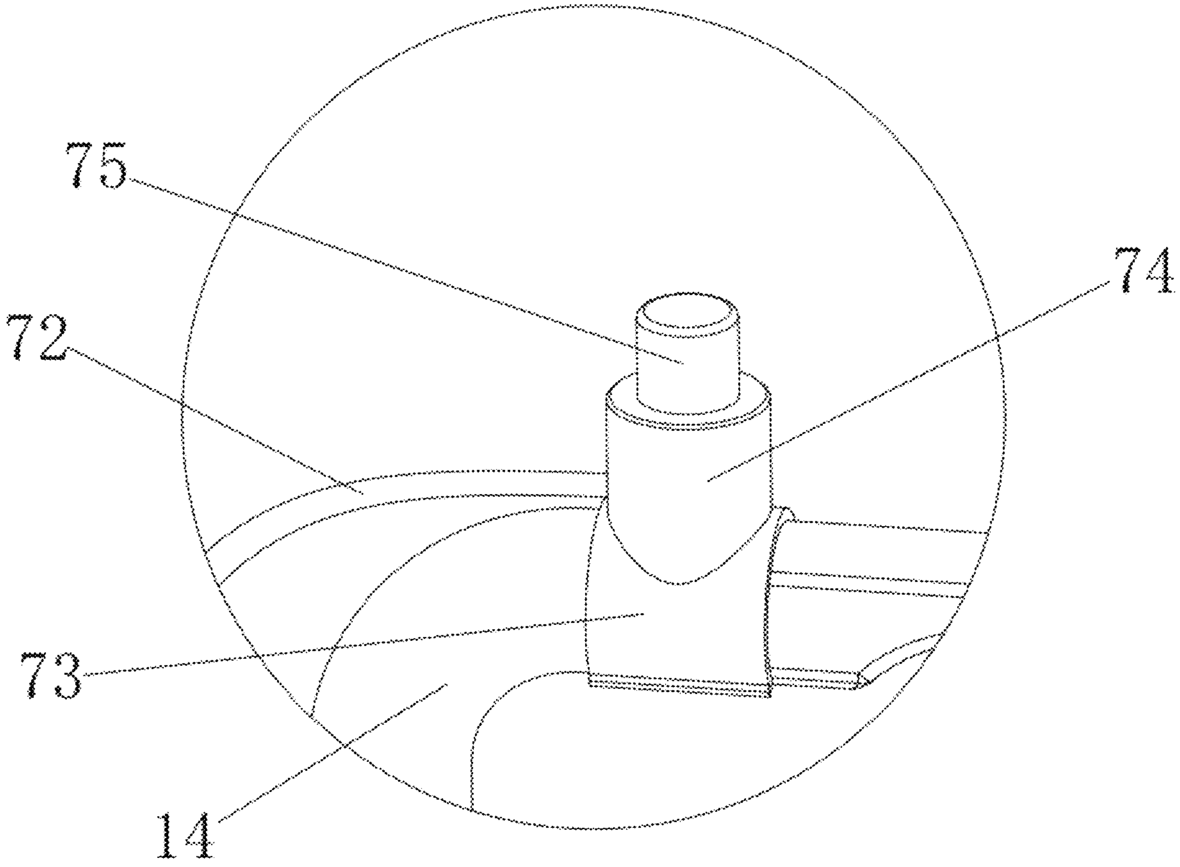
FIG. 12 is an enlarged view of part A in FIG. 11.
Figure 13:
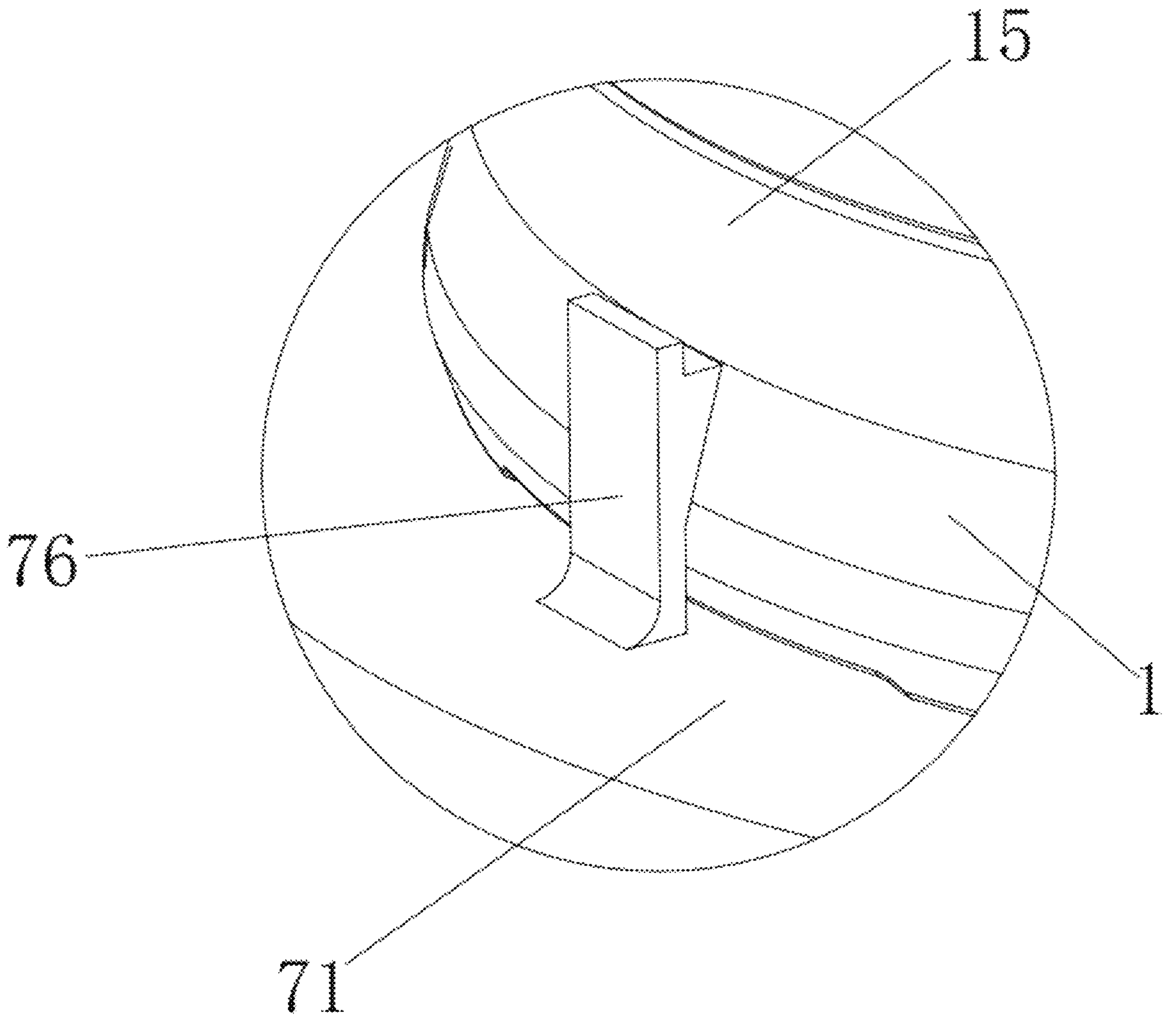
FIG. 13 is an enlarged view of part B in FIG. 11.
Figure 14:
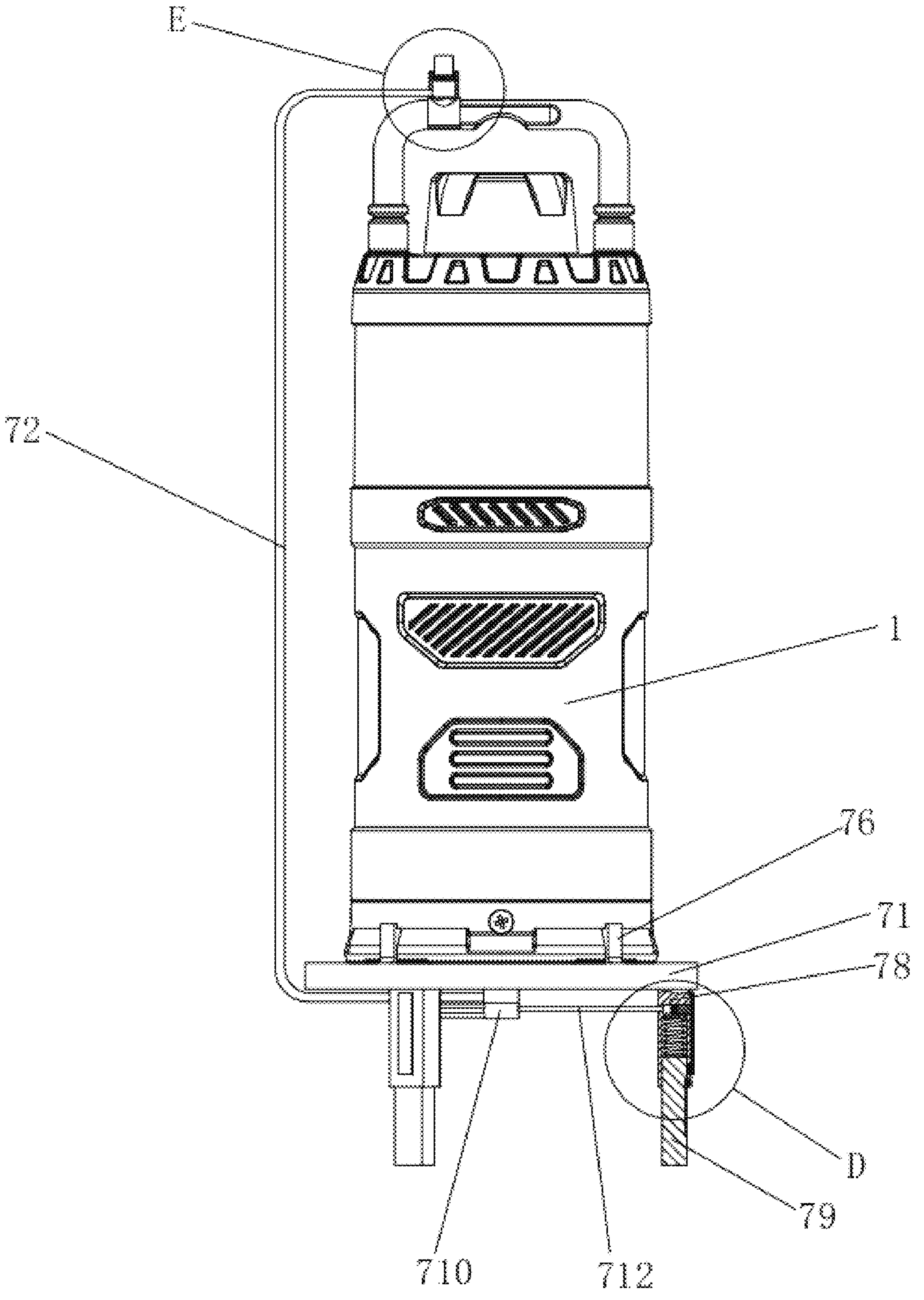
FIG. 14 is a partial sectional view of the camping lamp body where it is connected to the adaptive placement base.
Figure 15:
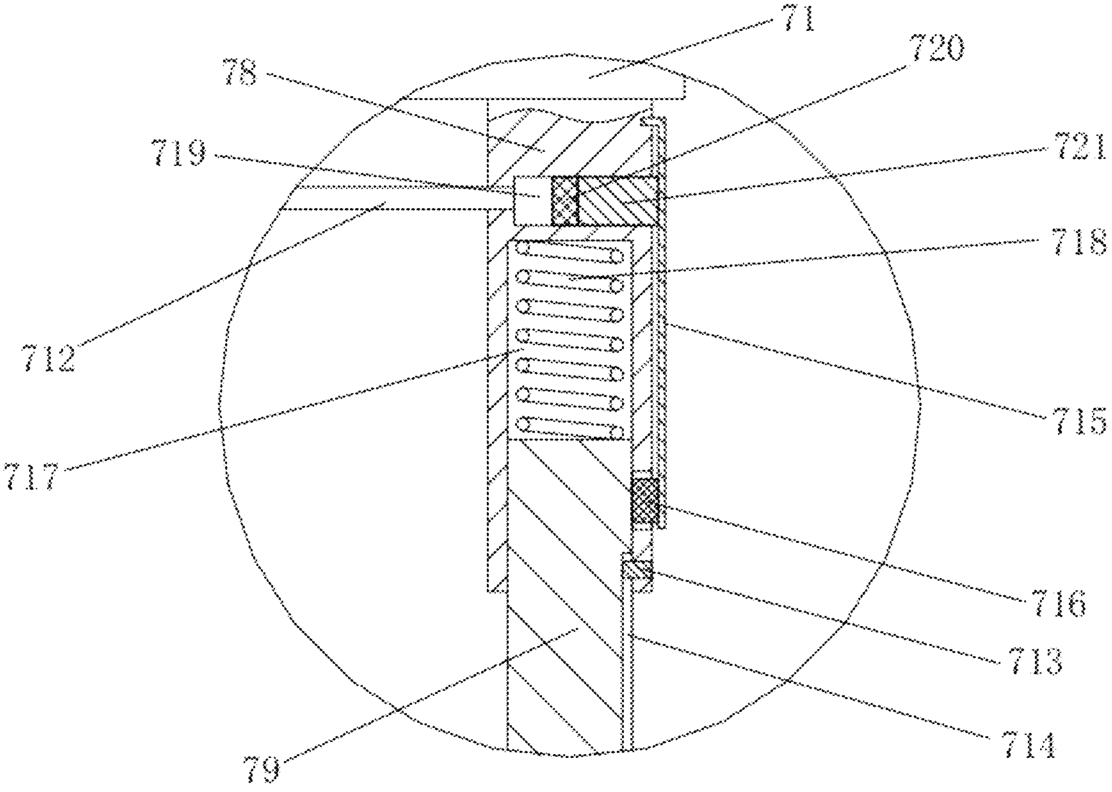
FIG. 15 is an enlarged view of part D in FIG. 14.
Figure 16:
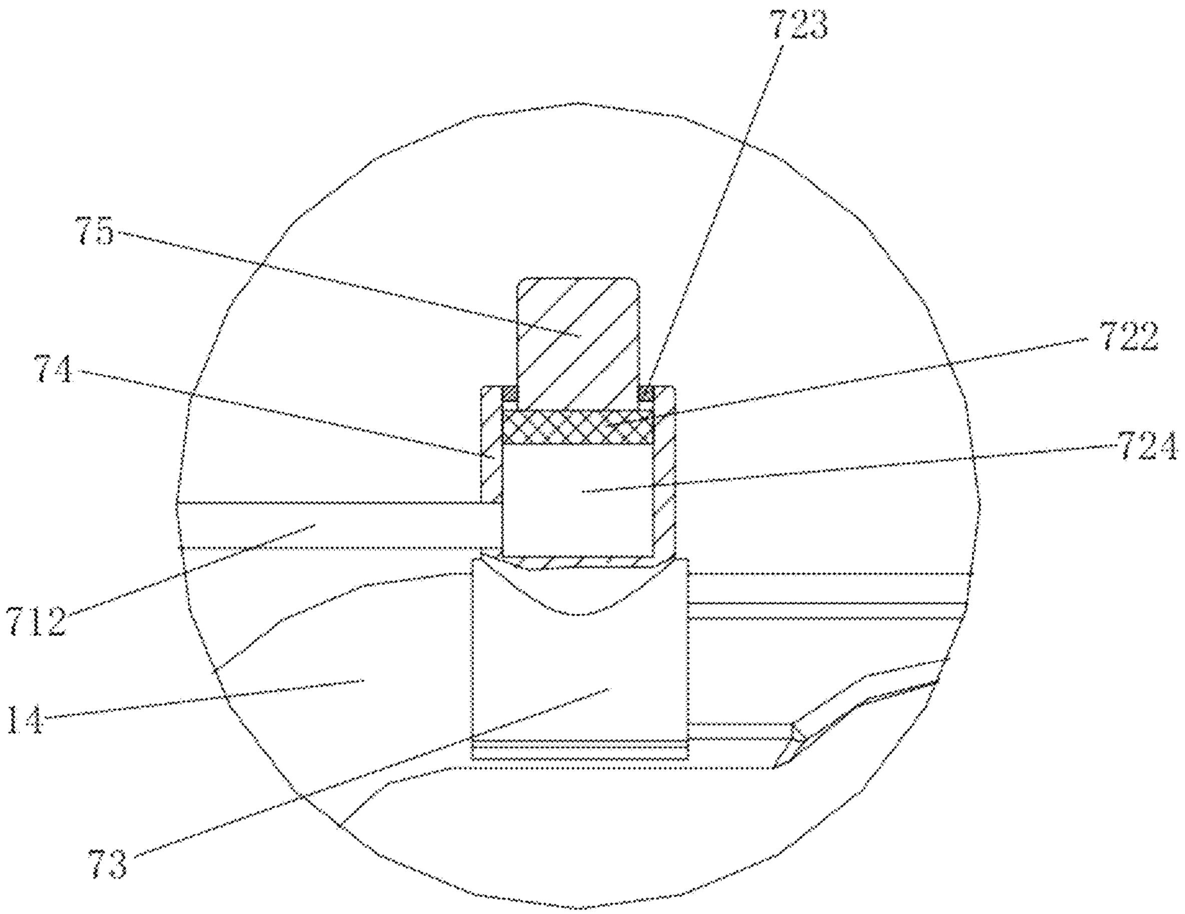
FIG. 16 is an enlarged view of part E in FIG. 14.

Please refer to FIG. 1 to FIG. 16:

The present invention provides a multipurpose camping lamp, which includes a camping lamp body 1 and a plurality of function expansion modules, wherein a control module and a storage battery module are arranged in the camping lamp body 1; a power supply connection mechanism is arranged between the function expansion modules and the camping lamp body 1; and the function expansion modules are electrically connected with the storage battery module in the camping lamp body 1 through the power supply connection mechanism and supply power to the function expansion modules through the storage battery module.

The camping lamp body 1 is provided with a light-transmitting cover 11, which is made of a transparent material and is cylindrical. The inside of the light-transmitting cover 11 is provided with a light-emitting component, and both the light-emitting component and the storage battery module are electrically connected with the control module, and power is supplied to the light-emitting component through the storage battery module.

In this embodiment, the light-emitting component is preferably an LED lamp bead. In other embodiments, the light-emitting component can also be an incandescent lamp, a fluorescent lamp, a halogen lamp, etc., so that the required light-emitting component can be adjusted according to different needs of users.

The outside of the camping lamp body 1 is provided with a switch 12, which is electrically connected with the control module and used turning the camping lamp body 1 on and off.

The function expansion module includes one or more of fan module 6, lighting module 4, mosquito repellent module 2, air pump module 5 and BLUETOOTH® audio module 3. The fan module 6 can blow air, the lighting module 4 can be similar to a flashlight, and it can illuminate within a certain distance. The mosquito repellent module 2 can repel mosquitoes, the air pump module 5 can play a role of inflation and can inflate some outdoor inflatable cushions. The BLUETOOTH® audio module 3 can be connected with mobile phones and other devices to play music externally.

In this embodiment, the camping lamp body 1 has a luminous function, and the camping lamp body 1 is turned on and off by a switch 12 arranged outside the camping lamp body 1. The camping lamp body 1 can be connected to function expansion modules, and different function expansion modules can realize different functions. When the function expansion modules are connected to the camping lamp body 1, the function expansion modules are electrically connected to the storage battery module in the camping lamp body 1 through the power supply connection mechanism, so as to realize power supply to the function expansion modules.

For example, when camping in hot weather, the fan module 6 can be connected to the camping lamp body 1, and air can be blown by the fan module 6, which has a certain cooling effect and provides a comfortable air circulation solution for users. This effect is especially suitable for occasions requiring local cooling or ventilation.

For another example, when there are many mosquitoes when camping at night, the mosquito repellent module 2 can be connected to the camping lamp body 1, preferably, the mosquito repellent module 2 is an electronic mosquito repellent. The mosquito repellent module 2 can have a mosquito repellent effect, which is helpful to improve the sleeping quality of campers.

Outdoor inflatable products (such as an air mattress, swimming ring, etc.) can be inflated by the air pump module 5.

Without doubt, the function expansion module of the present invention is not limited to the above-mentioned functions, but also can be an electric heater, which can provide heating for users in outdoor low-temperature environment; it can also be used as a charger, and other mobile electronic devices, such as mobile phones and tablet computers, can be charged if necessary.

To sum up, the function expansion module of the present invention can be any equipment suitable for outdoor camping, so as to realize the function of the camping lamp and also have multipurpose functions, and the user can connect the corresponding function expansion module to the camping lamp body 1 according to different needs, thus meeting the diverse needs of campers and improving the camping experience of users.

In this embodiment, the power supply connection mechanism includes a USB female connector 16 arranged at one end of the camping lamp body 1 and a USB male connector 8 arranged at one end of the function expansion module, and both the USB female connector 16 and the storage battery module are electrically connected to the control module. When the function expansion module is connected to the camping lamp body 1, the USB male connector 8 on the function expansion module is inserted into the USB female connector 16 at one end of the camping lamp body 1, thus realizing the electrical connection between the camping lamp body 1 and the function expansion module.

One end of the camping lamp body 1 is provided with a magnet 17, and one end of the function expansion module is provided with a magnetic attraction body 9 corresponding to the magnet 17. When the camping lamp body 1 is connected to the function expansion module, the magnet 17 attracts the magnetic attraction body 9. The magnetic attraction body 9 can be made of iron; through the mutual attraction between the magnet 17 and the magnetic attraction body, the stability of the connection between the camping lamp body 1 and the function expansion module is improved.

Without doubt, the camping lamp body 1 and the function expansion module are not only connected by magnetic attraction body as mentioned above but also can be bonded in other embodiments (not shown), such as hook and loop. Any other suitable detachable connection mode, such as a clamping connection or a threaded connection, can also be adopted.

The outside of the camping lamp body 1 is provided with a charging port 13, which is electrically connected with the control module, and the storage battery module inside the camping lamp body 1 can be charged through the charging port 13.

The camping lamp body 1 is cylindrical, and the upper end of the camping lamp body 1 is provided with a handle 14 which is U-shaped.

The function expansion module is axially abutted with the camping lamp body 1. When the lighting module 4 is connected with the camping lamp body 1, the lighting module 4 is located at one end of the camping lamp body 1, which is in the shape of a flashlight as a whole, and the cylindrical camping lamp body 1 can be used as a handle, which is convenient for users to hold and shine light at a certain distance.

The present invention further includes an adaptive placement base detachably connected to the bottom of the camping lamp body 1. Wherein, the adaptive placement base includes a bottom plate 71, a primary liquid pipe 72 and a secondary liquid pipe 712, and a detachable connection mechanism is arranged between the bottom plate 71 and the bottom of the camping lamp body 1.

Wherein, the detachable connection mechanism includes second elastic buckles 76 arranged on the bottom plate 71 and a conical surface 15 arranged outside the bottom of the camping lamp body 1. At least three second elastic buckles 76 are arranged on the bottom plate 71, and the second elastic buckles 76 are made of plastic and integrally formed with the bottom plate 71. The second elastic buckles 76 are arranged on the upper surface of the bottom plate 71 in a circular array. When the camping lamp body 1 is connected with the adaptive placement base, the second elastic buckles 76 contact the conical surface 15 on the outside of the bottom of the camping lamp body 1. The connection between the bottom plate 71 and the camping lamp body 1 is realized by the second elastic buckles 76, which facilitates the connection and disassembly between them.

The lower end of the bottom plate 71 is provided with three sleeves 78, which are arranged in a circular array at the lower end of the bottom plate 71. A guide hole 717 is arranged in the sleeve 78, and a telescopic rod 79 is slidably connected in the guide hole 717, and a spring 718 is arranged between the upper end of the telescopic rod 79 and the bottom of the guide hole 717. Both the sleeve 78 and the telescopic rod 79 are perpendicular to the bottom plate 71.

The telescopic rod 79 is provided with a limit groove 714 which is arranged along the axial direction of the telescopic rod 79, and the sleeve 78 is provided with a sliding limit pin 713 which extends into the limit groove 714 on the telescopic rod 79. Through the cooperation between the sliding limit pin 713 and the limit groove 714, the telescopic stroke of the telescopic rod 79 is controlled to prevent the telescopic rod 79 from slipping out of the sleeve 78.

The outer side of the sleeve 78 is provided with an elastic sheet 715 made of spring steel. One end of the elastic sheet 715 is fixedly connected with the sleeve 78, and the other end of the elastic sheet 715 is a free end, and the free end is provided with a pressing contact block 716 which can contact the side surface of the telescopic rod 79. The pressing contact block 716 may be made of rubber. The sleeve 78 is provided with a piston cavity, and a first piston 720 is arranged in the piston cavity. A first liquid chamber 719 is formed between the first piston 720 and one end of the piston cavity, and an ejector rod 721 is connected to the first piston 720, and the end of the ejector rod 721 far away from the first piston 720 is in contact with the elastic sheet 715.

The adaptive placement base also includes a piston barrel 74, in which a second piston 722 is arranged, and a pressing post 75 is connected to the second piston 722, and a second liquid chamber 724 is formed between the second piston 722 and one end in the piston barrel 74; the bottom plate 71 is provided with a liquid distributor 710, which is provided with an input port and three output ports communicating with the input port. One end of the primary liquid pipe 72 is connected to the second liquid chamber 724, and the other end of the primary liquid pipe 72 is connected to the input port of the liquid distributor 710. There are three secondary liquid pipes 712, which correspond to the sleeves 78 one by one. One end of the secondary liquid pipe 712 is connected to the output port of the liquid distributor 710, and the other end of the secondary liquid pipe 712 is connected to the first liquid chamber 719. Both the first liquid chamber 719 and the second liquid chamber 724 are filled with a liquid medium, and the liquid medium can be hydraulic oil.

The piston barrel 74 is provided with a first elastic buckle 73, the cross section of which is C-shaped. The first elastic buckle 73 is made of plastic and has certain elasticity. The upper end of the camping lamp body 1 is provided with a handle 14, and the piston barrel 74 is connected to the handle 14 arranged at the upper end of the camping lamp body 1 through the first elastic buckle 73.

Because the ground is uneven, the traditional camping lamp body 1 cannot be placed on the ground in a vertical posture because it will easily fall over; in this embodiment, the stability of the camping lamp body 1 can be improved by the adaptive placement base. The method of use of the adaptive placement base is as follows: firstly, the bottom plate 71 is connected to the bottom of the camping lamp body 1 through a detachable connection mechanism, and the piston barrel 74 is connected to the handle 14 at the upper end of the camping lamp body 1 through the first elastic buckle 73; then, the user holds the handle 14, and before the user presses the pressing post 75, the pressing contact block 716 arranged on the free end of the elastic sheet 715 comes into pressing contact with the side of the telescopic rod 79, and at this time, the telescopic rod 79 is locked and cannot move; when the user presses down the pressing post 75, the pressing post 75 pushes the second piston 722 to move downwards, thereby squeezing out the liquid medium in the second liquid chamber 724, and the liquid medium flows into the first liquid chambers 719 on the three sleeves 78 through the primary liquid pipe 72 and the secondary liquid pipe 712, and after the liquid medium flows into the first liquid chambers 719, the first piston 720 is pushed to move towards the elastic sheet 715; the ejector rod 721 abuts against the elastic sheet 715 and causes the free end of the elastic sheet 715 to bounce outward, so that the pressing contact block 716 moves away from the telescopic rod 79, and the telescopic rod 79 is in an unlocked state, and at this time, the telescopic rod 79 extends downward under the action of the spring 718; the user adjusts the camping lamp to the placing posture, so that the camping lamp body 1 is in a vertical state, and the lower ends of the three telescopic rods 79 are all in contact with the ground; then, the user releases the pressing post 75, and after releasing the pressing post 75, the elastic sheet 715, the ejector rod 721 and the first piston 720 are reset, and the liquid medium in the first liquid chamber 719 flows back into the second liquid chamber 724; the pressing contact block 716 at the free end of the elastic sheet 715 tightly presses the side of the telescopic rod 79 pressing the telescopic rod 79, so that the telescopic rod 79 is locked and cannot move; the camping lamp body 1 can be stably placed on the uneven ground in a vertical posture through the adaptive placement base, thus reducing the risk of the camping lamp body 1 overturning; when the adaptive placement base is not needed, the adaptive placement base can be conveniently detached from the camping lamp body 1.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed example

What is claimed is:

1. A multipurpose camping lamp, wherein, the multipurpose camping lamp comprises a camping lamp body and a plurality of function expansion modules, wherein a control module and a storage battery module are arranged in the camping lamp body; a power supply connection mechanism is arranged between the plurality of function expansion modules and the camping lamp body; the plurality of function expansion modules are electrically connected with the storage battery module in the camping lamp body through the power supply connection mechanism and supply power to the plurality of function expansion modules through the storage battery module; and the multipurpose camping lamp further comprises an adaptive placement base detachably connected to a bottom of the camping lamp body, and the adaptive placement base is capable of automatically keeping the multipurpose camping lamp horizontal according to a terrain.

2. The multipurpose camping lamp according to claim 1, wherein the plurality of function expansion modules comprises one or more of a fan module, a lighting module, a mosquito repellent module, an air pump module and a shortwave wireless communication audio module.

3. The multipurpose camping lamp according to claim 1, wherein the power supply connection mechanism comprises a Universal Serial Bus (USB) USB female connector arranged at one end of the camping lamp body and a USB male connector arranged at one end of at least one function expansion module of the plurality of function expansion modules; and both the USB female connector and the storage battery module are electrically connected with the control module.

4. The multipurpose camping lamp according to claim 1, wherein one end of the camping lamp body is provided with a magnet, and one end of at least one function expansion module of the plurality of function expansion modules is provided with a magnetic attraction body corresponding to the magnet, and when the camping lamp body is connected to the function expansion module, the magnet attracts the magnetic attraction body.

5. The multipurpose camping lamp according to claim 1, wherein a light-transmitting cover is arranged on the camping lamp body, a light-emitting component is arranged inside the light-transmitting cover, and the light-emitting component is electrically connected to the control module.

6. The multipurpose camping lamp according to claim 1, wherein the adaptive placement base comprises a bottom plate, a primary liquid pipe, and at least one secondary liquid pipe; and a detachable connection mechanism is arranged between the bottom plate and the bottom of the camping lamp body.

7. The multipurpose camping lamp according to claim 6, wherein three sleeves are arranged at a lower end of the bottom plate, and a respective guide hole is arranged in each of the three sleeves, a respective telescopic rod is slidably inserted through each of the respective guide holes, and a respective spring is arranged between an upper end of each of the telescopic rods and a hole bottom of each of the respective guide holes.

8. The multipurpose camping lamp according to claim 7, wherein a respective elastic sheet is arranged outside each of the three sleeves, one end of each of the respective elastic sheets is fixedly connected with the respective sleeve, and another end of each of the respective elastic sheets is a free end, and each of the respective free ends is provided with a pressing contact block which can contact with a side surface of the respective telescopic rod.

9. The multipurpose camping lamp according to claim 8, wherein each of the sleeves is provided with a respective piston cavity, and a respective first piston is arranged in each of the respective piston cavities, a respective first liquid cavity is formed between each of the respective first pistons and one end of the respective piston cavity, an ejector rod is connected to each of the respective first pistons, and one end of the ejector rod which is further away from the first piston than another end of the ejector rod is in contact with the respective elastic sheet.

10. The multipurpose camping lamp according to claim 9, wherein the adaptive placement base further comprises a piston barrel, and a second piston is arranged in the piston barrel, a pressing post is connected to the second piston, and a second liquid cavity is formed between the second piston and one end in the piston barrel.

11. The multipurpose camping lamp according to claim 10, wherein a liquid distributor is arranged on the bottom plate, one end of the primary liquid pipe is communicated with the second liquid cavity, and another end of the primary liquid pipe is connected with an input port of the liquid distributor.

12. The multipurpose camping lamp according to claim 11, wherein, the at least one secondary liquid pipe is at least three secondary liquid pipes and each of the secondary liquid pipes is in one-to-one correspondence with the respective sleeve, a respective end of each of the secondary liquid pipes is connected with a respective output port of the liquid distributor, and another respective end of each of the secondary liquid pipes is communicated with the first liquid cavity of the respective sleeve; each of the respective first liquid cavities and the second liquid cavity are filled with liquid media.

13. The multipurpose camping lamp according to claim 12, wherein the piston barrel is provided with a first elastic buckle, and a cross section of the first elastic buckle is C-shaped, an upper end of the camping lamp body is provided with a handle, and the piston barrel is connected with the handle through the first elastic buckle.

14. The multipurpose camping lamp according to claim 8, wherein the elastic sheet is made of spring steel.

15. The multipurpose camping lamp according to claim 7, wherein each of the respective telescopic rods is provided with a respective limit groove, which is arranged along an axial direction of the respective telescopic rod, and each of the respective sleeves is provided with a respective sliding limit pin, which extends into the respective limit groove on the respective telescopic rod.

16. The multipurpose camping lamp according to claim 6, wherein the detachable connection mechanism comprises at least three second elastic buckles arranged on the bottom plate and a conical surface arranged outside the bottom of the camping lamp body and when the camping lamp body is connected with the adaptive placement base, the second elastic buckle contacts the conical surface outside the bottom of the camping lamp body.

17. A multipurpose camping lamp, wherein, the multipurpose camping lamp comprises a camping lamp body and a plurality of function expansion modules, wherein the plurality of function expansion modules is detachably connected with the camping lamp body, and a power supply connection mechanism is arranged between the plurality of function expansion modules and the camping lamp body; and the multipurpose camping lamp further comprises an adaptive placement base detachably connected to a bottom of the camping lamp body, wherein the adaptive placement base comprises a supporting mechanism and an infusion mechanism for conveying liquid media to the supporting mechanism, and the infusion mechanism is used for pushing the supporting mechanism to extend.

18. The multipurpose camping lamp according to claim 17, wherein the supporting mechanism comprises a bottom plate and at least three sleeves, wherein the bottom plate is detachably connected with the camping lamp body, and the at least three sleeves are all installed at a bottom of the bottom plate, and a guide hole is arranged in each of the respective sleeves, a respective telescopic rod is slidably threaded through guide hole of each of the respective sleeves, and a spring is arranged between an upper end of each of the respective telescopic rod and a hole bottom of the respective guide hole.

19. The multipurpose camping lamp according to claim 18, wherein an elastic sheet is arranged outside each of the respective sleeves, one end of each of the respective elastic sheets is fixedly connected with the respective sleeve, another end of the respective elastic sheet is a free end, and the free end is provided with a pressing contact block which can contact with a side surface of the respective telescopic rod; and each of the respective sleeves is provided with a piston cavity, a first piston is arranged in the piston cavity, a first liquid cavity is formed between the respective first piston and one end of the respective piston cavity, an ejector rod is connected to each of the respective first pistons, and one end of the ejector rod which is further away from the respective first piston than another end of the ejector rod is in contact with the respective elastic sheet.

20. The multipurpose camping lamp according to claim 19, wherein the infusion mechanism comprises a piston barrel, a primary liquid pipe and at least three secondary liquid pipes, wherein a second piston is arranged in the piston barrel, a pressing post is connected to the second piston, and a second liquid cavity is formed between the second piston and one end of the piston barrel; and the bottom plate is provided with a liquid distributor, one end of the primary liquid pipe is connected to the second liquid cavity, and another end of the primary liquid pipe is connected with an input port of the liquid distributor;

one end of each of the respective secondary liquid pipes is connected with an output port of the liquid distributor, and another end of the respective secondary liquid pipe is connected to the first liquid cavity of the respective sleeve; and the first liquid cavity and the second liquid cavity are both filled with liquid media.

* * * * *